(12) United States Patent
Wood et al.

(10) Patent No.: US 8,340,923 B2
(45) Date of Patent: Dec. 25, 2012

(54) PREDICTING REMAINING USEFUL LIFE FOR A COMPUTER SYSTEM USING A STRESS-BASED PREDICTION TECHNIQUE

(75) Inventors: Alan Paul Wood, San Jose, CA (US); Kenny C. Gross, San Diego, CA (US); David K. McElfresh, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 336 days.

(21) Appl. No.: 12/752,767

(22) Filed: Apr. 1, 2010

(65) Prior Publication Data

US 2011/0246093 A1 Oct. 6, 2011

(51) Int. Cl.
*G06F 19/00* (2011.01)
(52) U.S. Cl. ........................................ 702/34
(58) Field of Classification Search ............ 702/34
See application file for complete search history.

(56) References Cited

OTHER PUBLICATIONS

Shunfeng Cheng and Michael Pecht, Multivariate State Estimation Technique for Remaining Useful Life Prediction of Electronic Products, 2007, Association for the Advancement of Artificial Intelligence, 7 pages.*

* cited by examiner

*Primary Examiner* — Tung S Lau
(74) *Attorney, Agent, or Firm* — Park, Vaughan, Fleming & Dowler LLP

(57) ABSTRACT

One embodiment of the present invention provides a system for predicting a remaining useful life (RUL) for a component in a set of components within a computer system. The system starts by collecting values of at least one degradation-related parameter associated with the operation of a monitored component within the computer system. Note that the degradation-related parameter is a direct measurement of a degree of degradation of the monitored component. The system additionally collects values of at least one stress-based parameter from the computer system. Note that the stress-based parameter measures an accumulative stress in the operating environment of the set of components which can cause degradation of the set of components. The system then uses the values of the at least one degradation-related parameter and the values of the at least one stress-based parameter to predict an RUL for a component in the set of components.

18 Claims, 4 Drawing Sheets

PREDICTING REMAINING USEFUL LIFE FOR A COMPUTER SYSTEM USING A STRESS-BASED PREDICTION TECHNIQUE

BACKGROUND

1. Field of the Invention

The present invention relates to techniques for detecting impending problems in computer systems. More specifically, the present invention relates to a method and apparatus for predicting the remaining useful life of a system component or a computer system.

2. Related Art

For many safety-critical applications of computers, it is not sufficient to know whether a component, a group of components, or a computer is healthy or at risk; the user also needs to know the "remaining useful life" (RUL) for the components or the computer with a high confidence factor. RUL estimation capability is important, for example, in scenarios such as the following. Suppose one is planning a mission-critical operation (for example a battle situation) that may last 72 hours. Before committing an asset, plus one or more human lives to the operation, one needs to know if the RUL of all computers aboard the asset is longer than 72 hours, and it is useful to know this with a quantitative confidence factor.

In addition to being crucial for life-critical applications, RUL estimation is also beneficial for many commercial applications which use enterprise servers. For example, consider a scenario where a server at a customer data center starts issuing warning flags in the middle of a busy work day. In this situation, the account team would likely want to know if the problematic field replaceable unit (FRU) needs to be swapped as soon as possible, or if the server could continue operating until a scheduled shutdown on Saturday night. RUL estimation capability could add significant return on investment in such situations.

Currently, a commonly used technique for assessing the reliability of a system component or a computer system is to estimate a mean-time-between-failure (MTBF) for the system component or the computer system. However, an MTBF estimation is a fairly crude measure that provides little insight into how long a computer system or a system component is likely to continue operating based on the current operational state of the computer system.

Another existing technique which can be used to provide RUL predictions for a system component involves directly monitoring the operation of individual system components. However, while this technique can provide an accurate RUL measurement for a single component, it is not always feasible to apply this technique to a large number of components. Furthermore, it is also difficult to make accurate predictions for a set of components or a system based on the measurements from a few components.

Hence what is needed is a method and a system which can provide users with an accurate RUL prediction for a component or a computer system without the above-described problems.

SUMMARY

One embodiment of the present invention provides a system for predicting a remaining useful life (RUL) for a component in a set of components within a computer system, wherein the set of components includes a monitored component. The system starts by collecting values of at least one degradation-related parameter associated with the operation of the monitored component. Note that the degradation-related parameter is a direct measurement of a degree of degradation of the monitored component. The system additionally collects values of at least one stress-based parameter from the computer system. Note that the stress-based parameter measures an accumulative stress in the operating environment of the set of components which can cause degradation of the set of components. The system then uses the values of the at least one degradation-related parameter and the values of the at least one stress-based parameter to predict an RUL for a component in the set of components.

In some embodiments, the system predicts an RUL for a component in the set of components by predicting a first RUL for the monitored component based on the values of the at least one degradation-related parameter. The system also predicts a second RUL for the set of components based on the values of the at least one stress-based parameter. The system then predicts an RUL for a component in the set of components based on the first RUL and the second RUL.

In some embodiments, the system predicts an RUL for a component in the set of components by first determining if the first RUL indicates that the monitored component is close to failure and if the second RUL indicates that the set of components is not close to failure. If so, the system predicts an RUL for the monitored component based on the first RUL. Note that the predicted RUL for the monitored component is significantly shorter than the second RUL.

In some embodiments, the system predicts an RUL for a component in the set of components by first determining if the first RUL indicates that the monitored component is not close to failure and if the second RUL indicates that the set of components is close to failure. If so, the system predicts an RUL for the monitored component based on the first RUL when the first RUL is associated with a high confidence level. Alternatively, the system predicts an RUL for the monitored component based on the second RUL when the first RUL is associated with a low confidence level.

In some embodiments, the system predicts an RUL for a component in the set of components by first determining if the first RUL indicates that the monitored component is close to failure sooner than expected and if the second RUL indicates that the set of components is close to failure. If so, the system determines that the set of components is approaching failure sooner than expected as a result of the operating environment stress which is more severe than expected.

In some embodiments, the system validates signals from sensors which are used to collect the values of at least one degradation-related parameter and values of at least one stress-based parameter.

In some embodiments, the system validates the signals from the sensors using a multivariate state estimation technique (MSET).

In some embodiments, the system predicts the RUL at one of the follow locations: (1) on the computer system; (2) on a loghost machine external to the computer system; and (3) within a centralized service center.

In some embodiments, the stress-based parameter can include: (1) temperature; (2) voltage; (3) current; (4) vibration; and (5) humidity.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
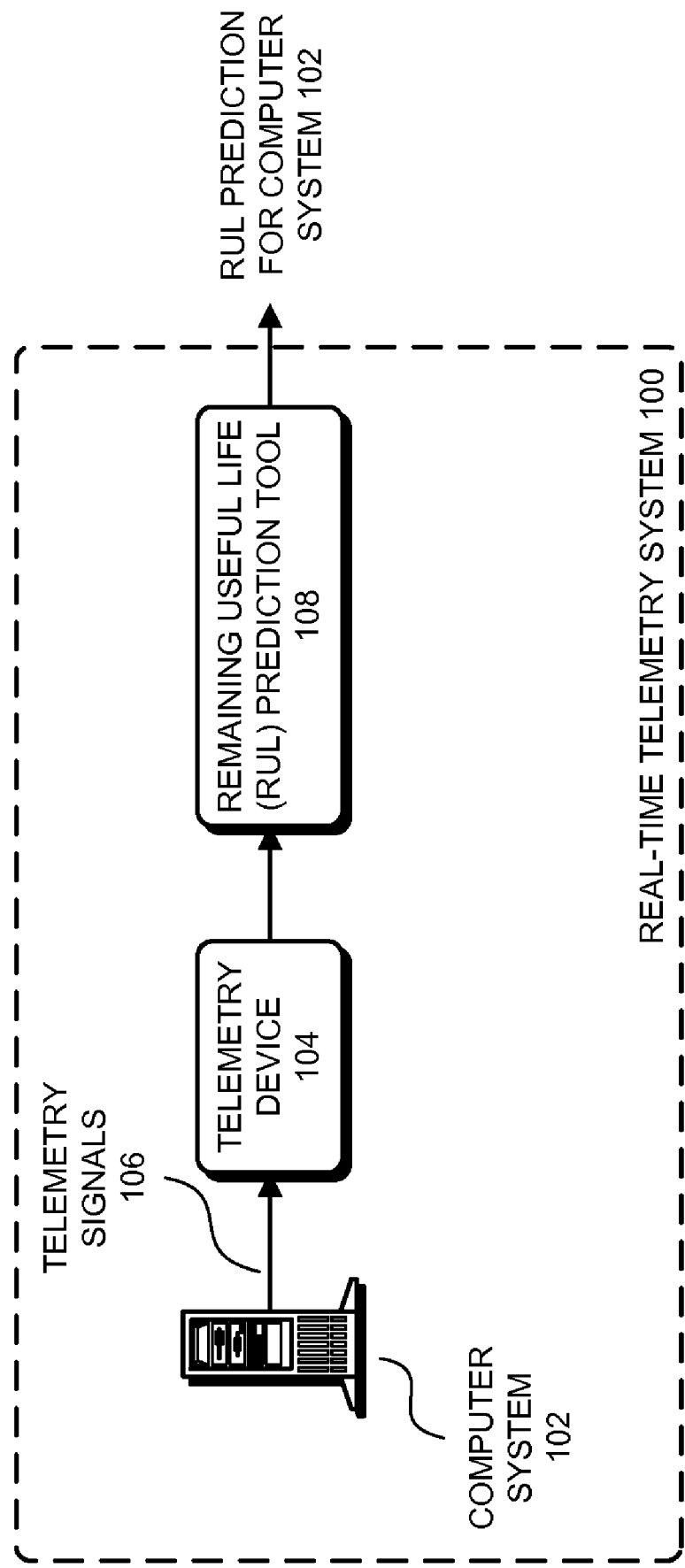
FIG. 1 illustrates a real-time telemetry system in accordance with an embodiment of the present invention.

FIG. 1 illustrates real-time telemetry system 100 in accordance with an embodiment of the present invention. Real-time telemetry system 100 contains computer system 102. Computer system 102 can be any type of computer system, such as a computer system based on a microprocessor, a mainframe computer, a digital signal processor, a portable computing device, a personal organizer, a device controller, and a computational engine within an appliance.

Real-time telemetry system 100 also contains telemetry device 104, which gathers telemetry signals 106 from the various sensors and monitoring tools within computer system 102, and directs telemetry signals 106 to a local or a remote location that contains remaining useful life (RUL) prediction tool 108.

Note that telemetry signals 106 gathered by telemetry device 104 can include signals associated with physical and/or software performance parameters measured through sensors within the computer system. The physical parameters can include, but are not limited to: distributed temperatures within the computer system, relative humidity, cumulative or differential vibrations within the computer system, fan speed, acoustic signals, currents, voltages, time-domain reflectometry (TDR) readings, and miscellaneous environmental variables. The software parameters can include, but are not limited to: load metrics, CPU utilization, idle time, memory utilization, disk activity, transaction latencies, system throughput, queue lengths, I/O traffic, bus saturation metrics, FIFO overflow statistics, and other performance metrics reported by the operating system.

Telemetry device 104 samples the values for various monitored signals ("telemetry metrics") within computer system 102 and reports these values to RUL prediction tool 108, so that RUL prediction tool 108 can compute an RUL for a component, a group of components, or entire computer system 102. This RUL can be used to make decisions about the subsequent operation of the component, the group of components, or computer system 102. For example, a system administrator may decide to take a computer system off-line for needed repairs before, rather than after, a busy season (such as income tax season for an on-line income tax service) if the RUL indicates that the system is very likely to fail during the busy season.

Figure 2:
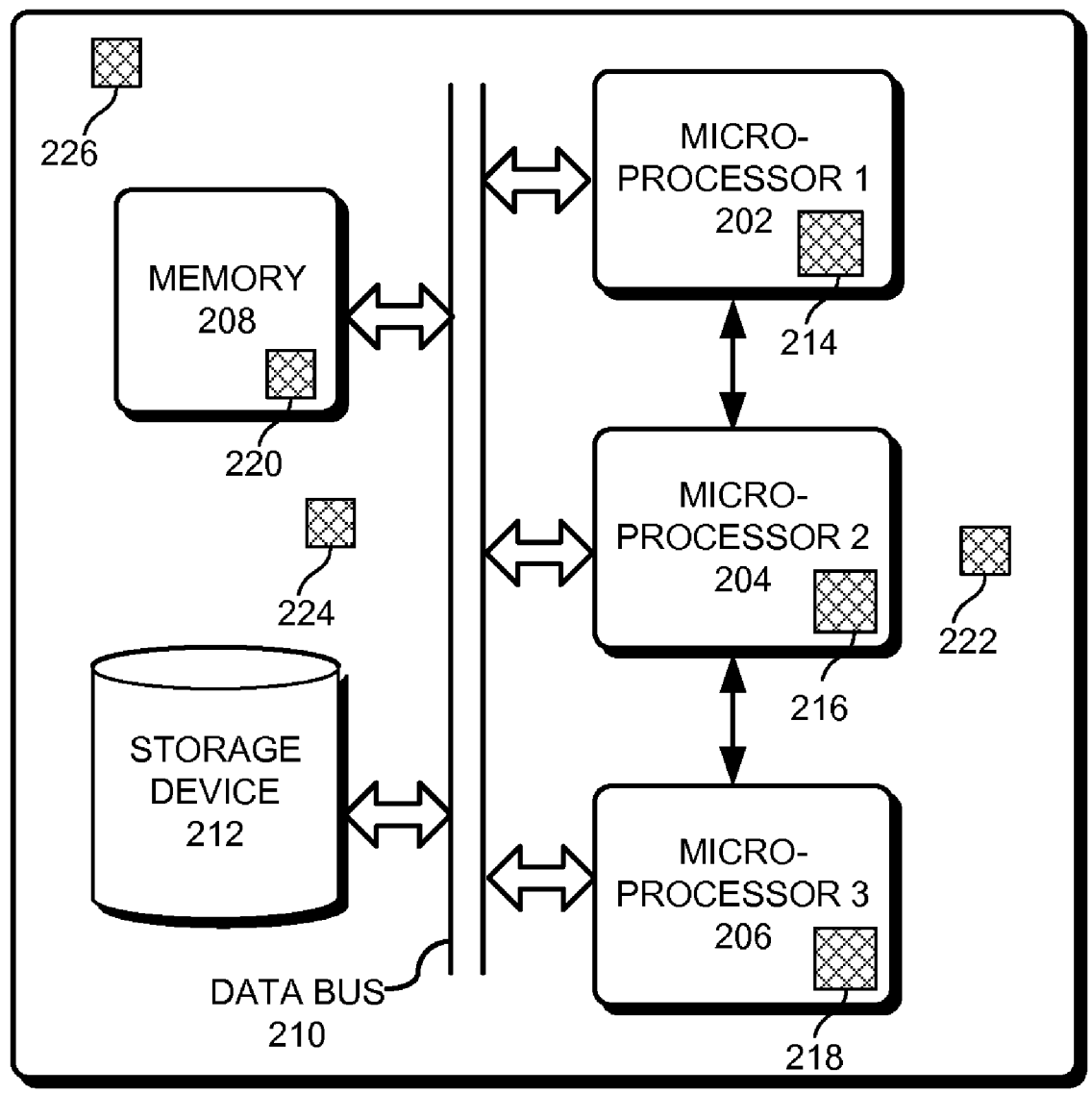
FIG. 2 illustrates an exemplary computer system with sensors that monitor signals in different parts of the computer system in accordance with an embodiment of the present invention.

FIG. 2 illustrates an exemplary computer system 102 with sensors that monitor signals in different parts of the computer system in accordance with an embodiment of the present invention.

Computer system 102 comprises multiple processors 202, 204, and 206. Processors 202, 204, and 206 communicate with memory 208 through data bus 210. Memory 208 can include any type of memory that can store code and data for execution by the processors 202, 204, and 206. This includes, but is not limited to, static random access memory (SRAM), dynamic RAM (DRAM), magnetic RAM (MRAM), non-volatile RAM (NVRAM), flash memory, and read only memory (ROM).

Processors 202, 204, and 206 communicate with storage device 212 through data bus 210. Storage device 212 can include any type of non-volatile storage device that can be coupled to a computer system. This includes, but is not limited to, magnetic, optical, and magneto-optical storage devices, as well as storage devices based on flash memory and/or battery-backed up memory.

Processors 202, 204, and 206 can include any type of processor, including, but not limited to, a microprocessor, a mainframe computer, a digital signal processor, a personal organizer, a device controller and a computational engine within an appliance.

In order to monitor a signal associated with the operation of computer system 102, several sensors 214, 216, 218, 220, 222, 224, and 226 can be selectively positioned throughout computer system 102. In one embodiment of the present invention, these sensors are categorized into two types. The first type of sensor (214, 216, 218, and 220) is used to monitor particular parameters associated with the operation of individual components within computer system 102. For example, sensor 220, which either resides on or is coupled to memory 208, can be used to monitor a particular voltage provided to a bank of storage cells (not shown) in memory 208. Other signals that can be monitored by the first type of sensor can include, but are not limited to, different voltage signals, different current signals, temperature, and one or more software performance metrics (such as CPU utilization, idle time, bandwidth, data rate, etc.).

The second type of sensor (222, 224, and 226) is used to monitor operating environment parameters associated with the operation of a set of components or the entire computer system 102. For example, sensor 222 can be used to monitor temperature in the vicinity of the set of microprocessors 1-3, while sensor 226 can be used to monitor a vibration level during the operation of computer system 102. As illustrated in FIG. 1, outputs from both the first type and the second type of sensor are collected by telemetry device 104 and reported to RUL prediction tool 108, so that RUL prediction tool 108 can compute an RUL for a component, a group of components, or entire computer system 102 based on these sensor signals.

Consider a system S which can be an individual electronic component, a field replaceable unit (FRU), or an entire computer system. Let TTF(t) be the "time to failure" of system S given that it is operating at time t. TTF(t) can also represent the "time to the next failure" in the case of a repairable system, in which case t is the accumulated operating time since the last failure. The remaining useful life (RUL) of system S may be defined as:

$$RUL(t)=TTF(t)-t.$$

Note that TTF(t) is time-dependent and typically a random variable with a certain probability distribution. Therefore, RUL(t) is also a random variable with a corresponding probability distribution. If the failure distribution TTF(t) of system S is exponentially distributed, (in other words, its probability of failure is independent of the operating time t), then the corresponding RUL(t) is also exponentially distributed, and the mean of RUL(t) is a constant independent of t. This constant mean is typically referred to as mean-time-before-failure (MTBF).

In many other cases, however, the failure distribution TTF(t) of system S is time-dependent and the probability of failure increases as a function of time due to wearout mechanisms. In these cases, RUL(t) is time-dependent, and its mean is a decreasing function of t. Hence, in such a case, it can be useful to predict RUL(t) and use the prediction to proactively replace S or otherwise mitigate its failure.

It is well-known that the time-to-failure of a component can be significantly affected by the operating environment of the component. Some operating environment related parameters can incur stress to a component over a period of time which leads the component to wear out and fail, and can accelerate subtle failure mechanisms within the component, and therefore lead to reduced RUL of the component. Some of these operating environment related parameters can include, but are not limited to, temperature, voltage, vibration, and humidity. We hereinafter refer to these operating environment parameters which can cause degradation and failure of one or a group of components through an accumulative stress as "stress-based parameters." However, the terms "operating environment parameters" and "stress-based parameters" are used interchangeably below.

Temperature as a stress-based parameter is known to exacerbate reliability issues, because hot spots and thermal cycling increase the rate of failures during device lifetimes. For example, local resistances scale linearly with temperature; increasing temperature leads to increasing circuit delays and IR drop. Moreover, most semiconductor degradation mechanisms accelerate with high temperature. In addition to problems associated with high temperatures and temperature cycling, some failure mechanisms are affected by temperature gradients. For example, as integrated circuit (IC) feature sizes continue to decrease, spatial temperature variations over an IC chip cause a number of problems, including but not limited to, timing failures due to variable delay, issues in clock tree design, and performance degradation. Among these problems, global clock networks on chips can be particularly vulnerable to spatial temperature variations because they are located throughout an IC die.

Moreover, temperature gradients can also cause the following problems: solder fatigue; interconnect fretting; differential thermal expansion between bonded materials which leads to delamination failures; thermal mismatches between mating surfaces; differential in the coefficients of thermal expansion (CTEs) between materials used in chip packages; wire-bond shear and flexure fatigue; passivation cracking; electromigration failures; corrosion; thermomigration failures; crack initiation and propagation; delamination between chip dies and molding compounds, or between the molding compound and the leadframe; die de-adhesion fatigue; repeated stress reversals in brackets which leads to dislocations, cracks, and eventual mechanical failures; and deterioration of connectors through elastomeric stress relaxation in polymers.

Voltage as a stress-based parameter, particularly in combination with thermal cycling, can accelerate failure mechanisms within a component by inducing changes to the component's crystal lattice structure. Examples of these failure mechanisms can include, but are not limited to, dielectric breakdown, hot carrier injection, negative bias temperature instability, surface inversion, localized charge trapping, and various forms of electro-chemical migration.

Humidity as a stress-based parameter, in combination with voltage and/or temperature, can accelerate corrosion which leads to failure modes such as stress corrosion cracking. Humidity-induced corrosion can also significantly accelerate electro-chemical migration rates. Moreover, humidity can cause delamination and other material degradation.

Similarly, vibration as a stress-based parameter can accelerate a number of stress-induced failure mechanisms inside computer systems, particularly stress-induced mechanical failures such as cracking and fatigue. For example, vibration levels (both amplitude and frequencies) in enterprise servers have been increasing significantly in data centers. The increasing frequencies of the vibrations in data center are partially due to ever-increasing rotation speeds of rotational components, such as air conditioning (AC) fans, power supply fans and blowers, as well as HDD spindle motors. Meanwhile, eco-efficiency best practices for data center design are calling for locating the AC modules as close as possible to the heat sources. Consequently, the overall vibration levels in data centers continue to climb as data center designers locate more AC modules at closer proximities to the server racks in many cases bolting the vibrating AC modules right onto the tops and sides of the metal racks in which the servers operate.

Currently, three techniques are often used for predicting the RUL(t) probability distribution for a component or a computer system. The first technique, referred to as a mean-time-between-failure (MTBF) prediction, uses reliability predictions, typically based on component field or test data to determine the failure distribution of an average component in an expected usage environment. The RUL(t) prediction based on the first technique then assumes all components and the usage environment are average.

A second technique, referred to as a damage-based RUL(t) prediction, involves directly measuring damage-related parameters associated with the operation of a component or a computer system and inferring damage or wear on the component or the system. For example, it may be possible to measure an electronic component's timing delay and then infer the changes to its silicon crystal lattice structure, which indicates a degree of damage or wear. The RUL(t) probability distribution can then be estimated based on the accumulated damage and rate at which damage is occurring. Note that, while damage-based prediction provides an accurate RUL(t) measurement of a single component, it may not provide an accurate prediction for a group of components.

A third technique, referred to as a stress-based RUL(t) prediction, is often used when it is difficult to directly measure parameters, such as circuit timing, that indicate the accumulated damage of individual components, but it is possible to measure operating environment parameters (i.e., stress-based parameters) that have known relationships with component damages. For example, it may be possible to measure one or more of the above-mentioned stress-based parameters and then use the measured values in established models for the stress-based failure mechanisms. The RUL(t) predictions can then be made based on the accumulated damage expected to have occurred due to the operating environment parameters. When monitoring and measuring many individual components is difficult, the stress-based RUL(t) prediction technique provides a globally based failure prediction for a greater number of components of the same or different types. Also note that this technique can suggest the onset of multiple failure mechanisms that would normally not trigger a threshold value or cause any change to the damage-based parameters.

Some embodiments of the present invention predict RUL(t) for individual components or a set of components by integrating the stress-based RUL(t) prediction technique with the damage-based RUL(t) prediction technique.

In this integrated technique, to predict RUL(t) for a monitored component, a first set of signals that directly indicate the health of the monitored component are measured. Additionally, a second set of signals that indicate the accumulated stresses in an operating environment where the monitored component is located are also measured. Note that the first set of signals is typically measured from degradation-related parameters associated with the operation of the monitored component. The second set of signals is typically measured from stress-based parameters associated with the operation environment. Next, the first set of signals is used to predict a first RUL(t) for the monitored component, and the second set of signals is used to predict a second RUL(t) for a set of components (including the monitored component) within the operating component. The integrated technique then predicts an RUL(t) for the monitored component or the set of components based on the first RUL(t) and the second RUL(t).

The integrated technique combines information from both the damage-based RUL(t) prediction and the stress-based RUL(t) prediction. Note that, when using each of the standalone techniques to make predictions is less accurate, the integrated technique facilitates more accurate predictions. In some cases, when the RUL(t) predictions from the two standalone techniques do not agree with each other, rich information can be extracted from such conflicts. A number of examples of making RUL(t) predictions based on the combined information are discussed below.

In a first example, if the first RUL(t) indicates that the monitored component is close to failure, and if the second RUL(t) indicates that the set of components including the monitored component is not close to failure, the system subsequently predicts an RUL(t) for the monitored component using the first RUL(t). Note that in this scenario the system makes a more conservative decision on the RUL(t). Moreover, because the predicted RUL(t) for the monitored component is significantly shorter than the expected RUL(t) for the set of components in the same operating environment, the system further concludes that the monitored component is weaker than expected. Note that, without the additional information provided by the stress-based RUL(t) prediction technique, the system may not be able to draw such a conclusion. After predicting the RUL(t) using the combined technique, the system can now use that information to guide the repair process. In one embodiment, a service person can proactively replace the monitored component before the actual failure occurs.

In a second example, if the first RUL(t) indicates that the monitored component is not close to failure, while the second RUL(t) indicates that the set of components including the monitored component is close to failure, the system subsequently predicts an RUL(t) for the monitored component using the first RUL(t). Moreover, because the predicted RUL(t) for the monitored component is significantly longer than the expected RUL(t) for the set of components in the same operating environment, the system may conclude that the monitored component is more robust than expected. Note that without the information provided by the damage-based RUL(t) prediction technique, the system may have to make a more conservative prediction than necessary for the monitored component.

Note that the above decision is typically made when the system has high confidence in the result from the damage-based RUL(t) prediction technique. However, for the second example the system may choose to use the more conservative result from the second RUL(t) if the system has a higher confidence in the result from the stress-based RUL(t) prediction technique or if the system does not have sufficient knowledge on which of the two prediction techniques is more accurate. For example, if the damage-based RUL(t) prediction technique does not monitor all possible damage parameters for a component, the system may not consider the first RUL(t) to have a sufficiently high confidence level. Note that the more conservative decision may cause a component to be proactively replaced earlier than predicted by the damage-based RUL(t) prediction technique, which can be a better decision for a particular system or component.

In a third example, if the first RUL(t) indicates that the monitored component is close to failure sooner than expected, and if the second RUL(t) also indicates that the set of components including the monitored component is close to failure, the system subsequently determines that the set of components is also approaching failure sooner than expected as a result of the operating environment stress which is more severe than expected. In this scenario, the system can make a more conservative decision on the RUL(t) for the set of components. Note that, without the additional information provided by the damage-based RUL(t) prediction technique, the system may not be able to draw such a conclusion for the set of components. The consistency of the results from the two prediction techniques increases the confidence level in the accuracy of the decision. After determining that a severe operating environment exists, the system can now use this information to guide the repair process. In one embodiment, a service person may proactively replace the set of components before the actual failures occur. In some embodiments, a higher level assembly or entire system can be scrapped instead of being repaired. Note that the system can also use the information on the environment to provide feedback to the user which might allow the user to decrease the stress of the environment, thereby facilitating increasing the RUL(t).

Note that embodiments of the present technique can use a continuous system telemetry harness (CSTH) to track environmental and component-based system metrics that are known to accelerate component failure mechanisms. This technique may be applied to a system having a large number of distributed temperature sensors inside enterprise servers, and to a system which uses internal microelectromechanical system (MEMS) accelerometers for real-time vibration sensing. This technique can also be applied to a system which infers vibration levels based on I/O throughput metrics, instead of using the internal MEMS accelerometers.

Using the present technique, it is possible to integrate stress-based RUL(t) predictions with damage-based RUL(t) predictions to achieve "condition-based maintenance" so that field-replaceable-units (FRUs) can be proactively replaced based on their present and cumulative stress levels, and spare parts can be ordered prior to proactive replacements, thereby significantly reducing spare-part inventory costs.

In one embodiment of the present invention, prior to predicting an RUL(t) for a component or a set of components, the system validates the raw telemetry signals from the sensors which are used to collect these signals, thereby ensuring that only fully validated sensor readings are used by RUL prediction tool 108 for the RUL(t) computations. In particular, the system preprocesses the raw signals using a pattern recognition technique referred to as the multivariate state estimation technique (MSET), which is specifically designed for signal validation and sensor operability validation. In the system of FIG. 1, this validation process may be performed by telemetry device 104. Note that we use the term "MSET" in the present invention to refer to generic nonlinear, nonparametric regression, but not to a specific implementation or commercial product.

Note that over the lifetime of a computer system, the physical sensors may degrade in service and may drift out of calibration. For example, it is found that in some servers the physical sensors inside the servers have a shorter MTBF than the system components they are designed to protect. One particular type of degradation for sensors is known as a "stuck-at" fault (meaning the transducer retains its last mean value, but is no longer responding to changes in the sensed variable). When this type of fault occurs in a computer server, the server is vulnerable to serious undetected degradation due to a thermal event, elevated vibration level, or other environmental excursion. Even more likely, however, is that the sensor eventually drifts out of calibration. In such a case the RUL(t) analytics could generate impending-failure warnings and expensive assets could be taken out of service unnecessarily.

By using correlation patterns among a set of the telemetry variables, MSET can detect with a high sensitivity whether any individual sensors are experiencing physical degradation or de-calibration drift. Hence, when integrating the present RUL(t) prediction technique with MSET for signal validation and sensor operability validation, the RUL(t) estimation tool uses only fully validated signals and the above-described problems can be avoided.

Figure 3:
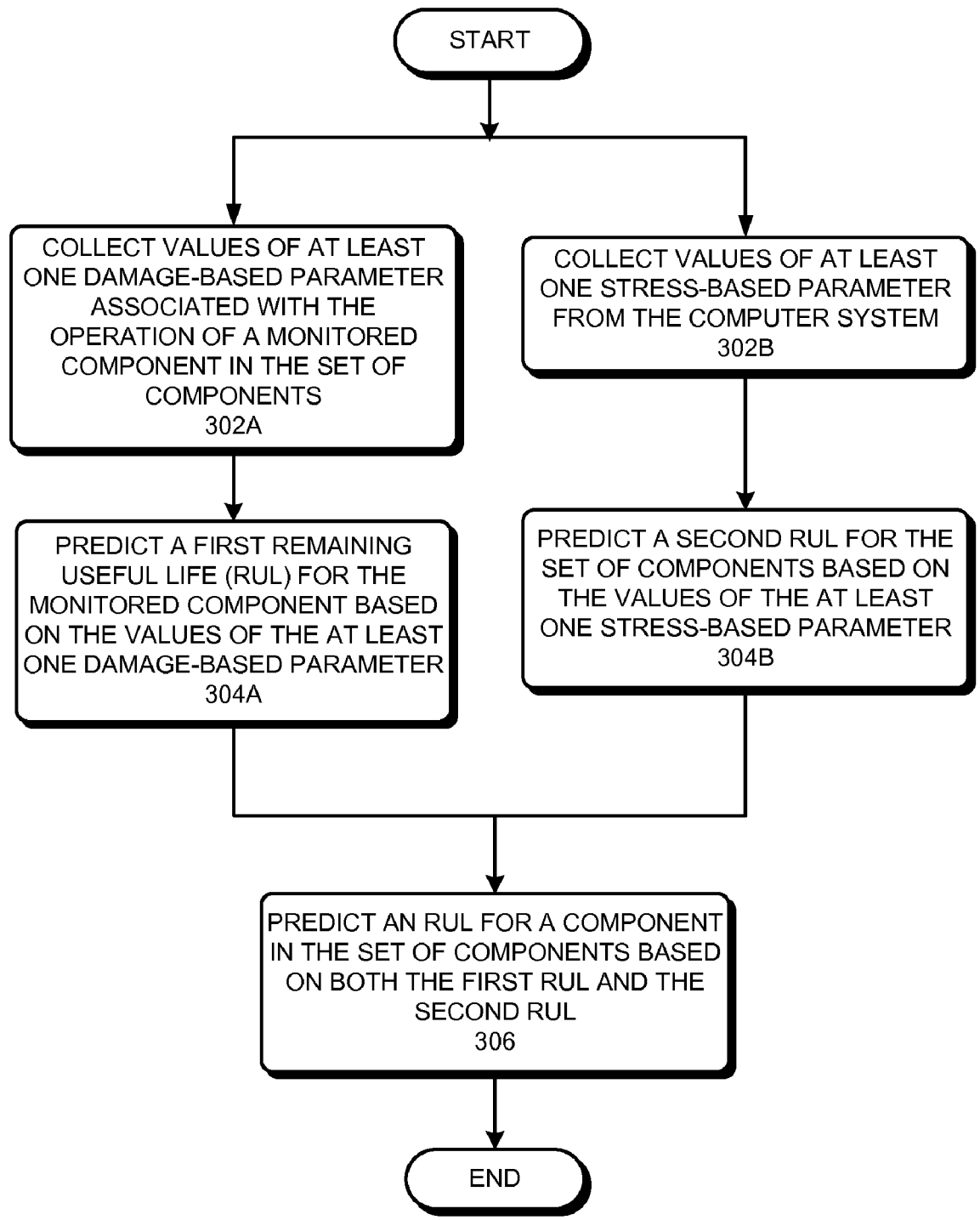
FIG. 3 presents a flowchart illustrating the process of predicting an RUL for a component in a set of components within a computer system in accordance with an embodiment of the present invention.

FIG. 3 presents a flowchart illustrating the process of predicting an RUL for a component in a set of components within computer system 102 in accordance with an embodiment of the present invention.

During operation, the system starts by collecting values of at least one damage-based parameter associated with the operation of a monitored component in the set of components (step 302A). Note that the damage-based parameter is a direct measurement of a degree of degradation of the monitored component. The system additionally collects values of at least one stress-based parameter from the computer system (step 302B). Note that the stress-based parameter measures an accumulative stress in the operating environment of the set of components which can cause degradation of the set of components.

In one embodiment, prior to collecting the above values from the set of components, the system validates signals from sensors which are used to collect these values to ensure that only fully validated sensor readings are collected and used for subsequent RUL prediction computations.

Next, the system predicts a first RUL for the monitored component based on the values of the at least one damage-based parameter (step 304A). The system separately predicts a second RUL for the set of components based on the values of the at least one stress-based parameter (step 304B). The system then predicts an RUL for a component in the set of components based on both the first RUL and the second RUL (step 306)

Figure 4:
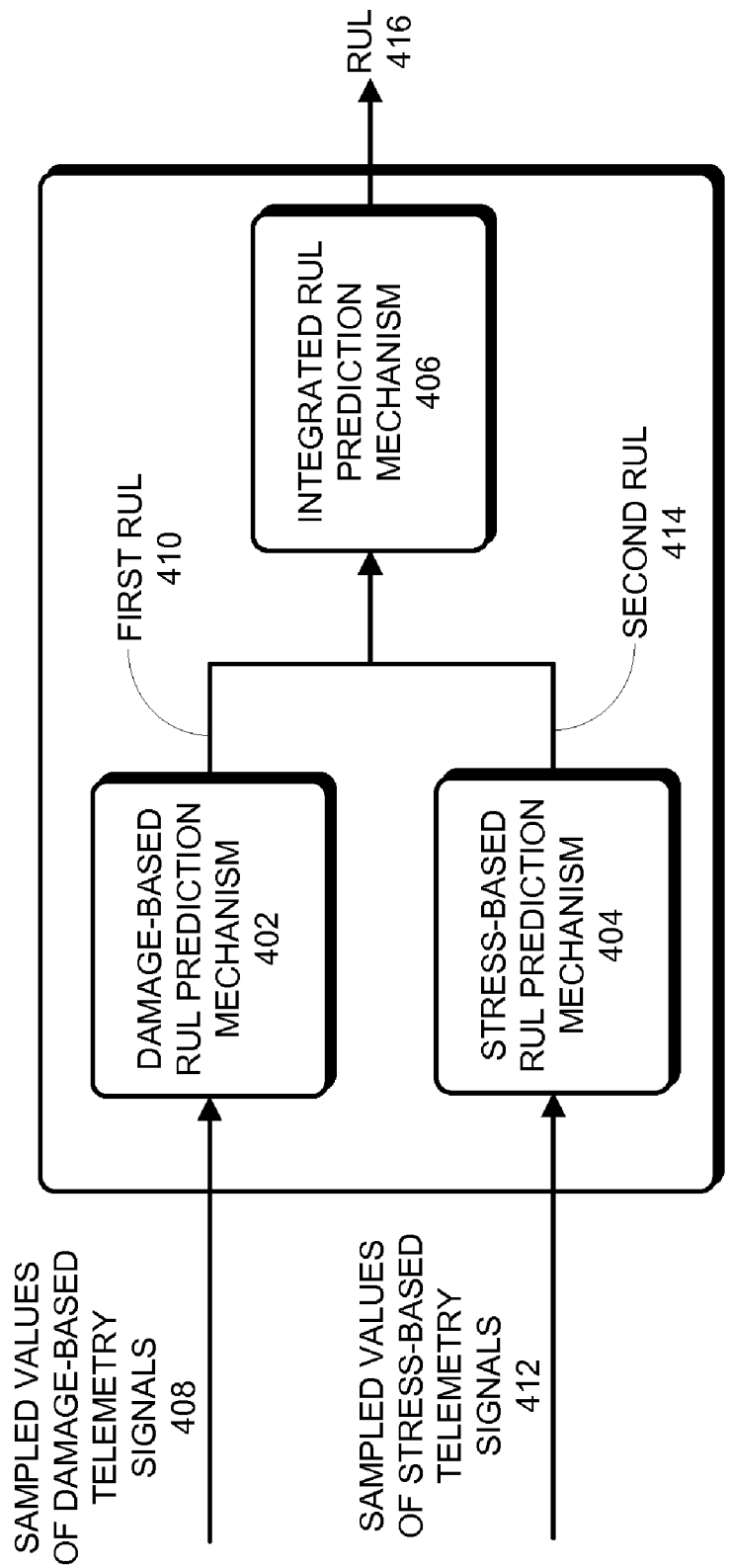
FIG. 4 illustrates an example of RUL prediction tool 108 in FIG. 1 in accordance with an embodiment of the present invention.

FIG. 4 illustrates RUL an example of prediction tool 108 in FIG. 1 in accordance with an embodiment of the present invention. RUL prediction tool 108 includes a damage-based RUL prediction mechanism 402, a stress-based RUL prediction mechanism 404, and an integrated RUL prediction mechanism 406.

In one embodiment, damage-based RUL prediction mechanism 402 receives sampled values of damage-based telemetry signals 408 from telemetry device 104, and subsequently uses the received signal values to predict a first RUL 410 for a monitored component in the computer system 102. Separately, stress-based RUL prediction mechanism 404 receives sampled values of stress-based telemetry signals 412 from telemetry device 104, and subsequently uses the received signal values to predict a second RUL 414 for a set of components in the computer system 102. The integrated RUL prediction mechanism 406 then uses first RUL 410 for the monitored component and second RUL 414 for the set of components to predict an RUL 416 for a component in the set of components.

Note that while FIG. 1 depicts a telemetry system 100 which performs RUL(t) prediction at a location external to the system (102) being monitored, other embodiments can have different implementation scenarios in terms of where the sensor operability validation and the RUL(t) prediction computations are performed. A few exemplary implementation scenarios are described below:

(A) Individual Server Self-Monitoring: All data harvesting and RUL(t) analytical computations are performed directly on the server being monitored. Most enterprise servers today come with a System Processor (SP) chip that performs system management functions, including the emerging standard Integrated Lights Out Management (ILOM) operation. For servers that have an SP, all RUL(t) estimation computations described in the present invention can be performed on the SP. In doing so, the RUL(t) estimation uses no customer CPU cycles. For servers that do not have an SP, the RUL(t) estimation computations may be performed as a background daemon process on any CPU in the server.

(B) Loghost Monitoring of Multiple Servers: It is typical in data centers for the service provider to install a "loghost" machine. The loghost machine is a small server that collects the output log files from all the operating system message and error logs for a large number of servers in the data center. Each loghost machine typically monitors dozens or hundreds of servers in the data center. For this deployment scenario, all RUL(t) estimation computations are performed on the loghost machine. The advantage this scenario has over the Individual Server Self-Monitoring scenario above is that all diagnostics, prognostics, and telemetry signature history signals for any server in the data center are available at any time, even in situations where the server of interest has crashed.

(C) Service Center Monitoring for Multiple Customer Data Centers: For this deployment model, all RUL(t) computations are performed at a centralized service center for multiple customer data centers. In one embodiment, all telemetry signals that directly indicate the health of server components, and signals that indicate the accumulated stresses in customers' data center environments, are brought back to the centralized Service Center through connected customer pipes via a remote monitoring architecture. This may be a highly desirable deployment scenario for the service provider because it allows proactive sparing logistics and allows at-risk FRUs to be swapped out before the customer ever becomes aware they almost had a problem. For customers who deal with top secret computations, or with finance or human health information, or who otherwise have very stringent administrative rules that disallow any data of any type to leave their data center firewall, deployment scenarios (A) or (B) may be preferred.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for predicting a remaining useful life (RUL) for a component in a set of components within a computer system, wherein the set of components includes a monitored component, the method comprising, in at least one computer, performing operations for:
   collecting values of at least one degradation-related parameter associated with the operation of the monitored component within the computer system, wherein the degradation-related parameter is a direct measurement of a degree of degradation of the monitored component;
   collecting values of at least one stress-based parameter from the computer system, wherein the stress-based parameter measures an accumulative stress in the operating environment of the set of components which can cause degradation of the set of components; and
   predicting an RUL for a component in the set of components using at least a predicted first RUL for the monitored component and a predicted second RUL for the set of components, wherein the first RUL is predicted based at least on the values of the at least one degradation-related parameter and the second RUL is predicted based at least on the values of the at least one stress-based parameter;
   wherein predicting the RUL for the component in the set of components using at least the first RUL and the second RUL involves:
   determining if the first RUL indicates that the monitored component is not close to failure and if the second RUL indicates that the set of components is close to failure; and
   if so, predicting the RUL for the monitored component based on the first RUL when the first RUL is associated with a first confidence level; and
   otherwise, predicting the RUL for the monitored component based on the second RUL when the first RUL is associated with a second confidence level that is lower than the first confidence level.

2. The method of claim 1, further comprising:
   predicting the first RUL for the monitored component based at least on the values of the at least one degradation-related parameter; and
   predicting the second RUL for the set of components based at least on the values of the at least one stress-based parameter.

3. The method of claim 1, wherein predicting an RUL for a component in the set of components based at least on the first RUL and the second RUL involves:
   determining if the first RUL indicates that the monitored component is close to failure and if the second RUL indicates that the set of components is not close to failure; and
   if so, predicting an RUL for the monitored component based on the first RUL, wherein the predicted RUL for the monitored component is shorter than the second RUL.

4. The method of claim 3, wherein the method further comprises replacing the monitored component proactively.

5. The method of claim 1, wherein the method further comprises predicting an RUL for the set of components other than the monitored component based on the second RUL, wherein the predicted RUL for the set of components is shorter than the first RUL.

6. The method of claim 1, wherein predicting an RUL for a component in the set of components based at least on the first RUL and the second RUL involves:
   determining if the first RUL indicates that the monitored component is close to failure sooner than expected and if the second RUL indicates that the set of components is close to failure; and
   if so, determining that the set of components is approaching failure sooner than expected as a result of the operating environment stress which is more severe than expected.

7. The method of claim 1, wherein the method further comprises validating signals from sensors which are used to collect the values of at least one degradation-related parameter and values of at least one stress-based parameter.

8. The method of claim 1, wherein predicting the RUL can take place at least one of the following locations:
   on the computer system;
   on a loghost machine external to the computer system; and
   within a centralized service center.

9. The method of claim 1, wherein the stress-based parameter includes one or more of the following:
   temperature;
   voltage;
   current;
   vibration; and
   humidity.

10. The method of claim 6, wherein the method further comprises proactively replacing the set of components.

11. The method of claim 7, wherein validating the signals from the sensors involves using a multivariate state estimation technique (MSET).

12. An apparatus that predicts a remaining useful life (RUL) for a component in a set of components within a computer system, wherein the set of components includes a monitored component, comprising:
   a collection mechanism coupled to the computer system, wherein the collection mechanism is configured to collect values of at least one degradation-related parameter associated with the operation of the monitored component within the computer system, wherein the degradation-related parameter is a direct measurement of a degree of degradation of the monitored component;
   wherein the collection mechanism is further configured to collect values of at least one stress-based parameter from the computer system, wherein the stress-based parameter measures an accumulative stress in the operating environment of the set of components which can cause degradation of the set of components; and a first RUL prediction mechanism coupled to the collection mechanism, wherein the first RUL prediction mechanism is configured to predict an RUL for a component in the set of components using at least a predicted first RUL for the monitored component and a predicted second RUL for the set of components, wherein the first RUL is predicted based at least on the values of the at least one degradation-related parameter and the second RUL is predicted based at least on the values of the at least one stress-based parameter;

wherein the first RUL prediction mechanism is configured to:
  determine if the first RUL indicates that the monitored component is not close to failure and if the second RUL indicates that the set of components is close to failure; and
  if so, predict the RUL for the monitored component based on the first RUL when the first RUL is associated with a first confidence level; and
  otherwise, predict the RUL for the monitored component based on the second RUL when the first RUL is associated with a second confidence level that is lower than the first confidence level.

13. The apparatus of claim 12, further comprising:
  a second RUL prediction mechanism configured to predict the first RUL for the monitored component based at least on the values of the at least one degradation-related parameter; and
  a third RUL prediction mechanism configured to predict the second RUL for the set of components based at least on the values of the at least one stress-based parameter.

14. The apparatus of claim 12, wherein the first RUL prediction mechanism is further configured to:
  determine if the first RUL indicates that the monitored component is close to failure and if the second RUL indicates that the set of components is not close to failure; and
  if so, predict the RUL for the monitored component based on the first RUL, wherein the predicted RUL for the monitored component is shorter than the second RUL.

15. The apparatus of claim 12, wherein the first RUL prediction mechanism is further configured to:
  determine if the first RUL indicates that the monitored component is close to failure sooner than expected and if the second RUL indicates that the set of components is close to failure; and
  if so, determine that the set of components is approaching failure sooner than expected as a result of the operating environment stress which is more severe than expected.

16. The apparatus of claim 12, wherein the first RUL prediction mechanism can reside on at least one of the following locations:
  the computer system;
  a loghost machine external to the computer system; and
  a centralized service center.

17. A computer-readable storage medium storing instructions that when executed by a computer cause the computer to perform a method for predicting a remaining useful life (RUL) for a component in a set of components within a computer system, wherein the set of components includes a monitored component, the method comprising:
  collecting values of at least one degradation-related parameter associated with the operation of the monitored component within the computer system, wherein the degradation-related parameter is a direct measurement of a degree of degradation of the monitored component;
  collecting values of at least one stress-based parameter from the computer system, wherein the stress-based parameter measures an accumulative stress in the operating environment of the set of components which can cause degradation of the set of components; and
  predicting an RUL for a component in the set of components using at least a predicted first RUL for the monitored component and a predicted second RUL for the set of components, wherein the first RUL is predicted based at least on the values of the at least one degradation-related parameter and the second RUL is predicted based at least on the values of the at least one stress-based parameter;
  wherein predicting the RUL for the component in the set of components using at least the first RUL and the second RUL involves:
    determining if the first RUL indicates that the monitored component is not close to failure and if the second RUL indicates that the set of components is close to failure; and
    if so, predicting the RUL for the monitored component based on the first RUL when the first RUL is associated with a first confidence level; and
    otherwise, predicting the RUL for the monitored component based on the second RUL when the first RUL is associated with a second confidence level that is lower than the first confidence level.

18. The computer-readable storage medium of claim 17, wherein predicting the RUL for a component in the set of components involves:
  predicting the first RUL for the monitored component based at least on the values of the at least one degradation-related parameter; and
  predicting the second RUL for the set of components based at least on the values of the at least one stress-based parameter.

* * * * *